US011599262B2

(12) United States Patent
Jin et al.

(10) Patent No.: US 11,599,262 B2
(45) Date of Patent: Mar. 7, 2023

(54) ELECTRONIC DEVICE FOR RECOGNIZING FINGERPRINT OF USER AND METHOD THEREOF

(71) Applicant: Samsung Electronics Co., Ltd., Suwon-si (KR)

(72) Inventors: Yunjang Jin, Suwon-si (KR); Jongho Park, Suwon-si (KR); Jungwoo Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/231,253

(22) Filed: Apr. 15, 2021

(65) Prior Publication Data
US 2021/0326553 A1     Oct. 21, 2021

(30) Foreign Application Priority Data

Apr. 17, 2020  (KR) ........................ 10-2020-0046895

(51) Int. Cl.
*G06V 40/12*     (2022.01)
*G06F 3/0488*    (2022.01)
(Continued)

(52) U.S. Cl.
CPC .............. *G06F 3/0488* (2013.01); *G06F 3/02* (2013.01); *G06F 3/041* (2013.01); *G06V 10/30* (2022.01);
(Continued)

(58) Field of Classification Search
CPC .... G06K 9/0002; G06K 9/00067; G06K 9/34; G06K 9/00912; G06F 3/02; G06F 3/041;
(Continued)

(56) References Cited

U.S. PATENT DOCUMENTS

2018/0032785 A1   2/2018  Li
2018/0121703 A1   5/2018  Jung et al.
(Continued)

FOREIGN PATENT DOCUMENTS

KR   10-2013-0024501    *  3/2013   ............... G06K 9/40
KR   10-2013-0024501 A    3/2013
(Continued)

OTHER PUBLICATIONS

International Search Report dated Jul. 26, 2021, issued in International Application No. PCT/KR2021/004712.

*Primary Examiner* — Jonathan A Boyd
(74) *Attorney, Agent, or Firm* — Jefferson IP Law, LLP

(57) ABSTRACT

An electronic device is provided. The electronic device includes a display, a fingerprint recognition sensor disposed under a first area of the display, at least one input detection sensor, and at least one processor electrically connected with the display, the fingerprint recognition sensor, and the at least one input detection sensor, wherein the at least one processor is configured to detect a designated event through the at least one input detection sensor, acquire background information through the fingerprint recognition sensor according to detection of the designated event, acquire fingerprint information of an object through the fingerprint recognition sensor in response to detecting the object on the first area of the display, and subtract the background information from the fingerprint information.

22 Claims, 13 Drawing Sheets

(51) Int. Cl.

| | |
|---|---|
| *G06F 3/041* | (2006.01) |
| *G06F 3/02* | (2006.01) |
| *G06V 40/13* | (2022.01) |
| *G06V 10/30* | (2022.01) |
| *G06V 10/26* | (2022.01) |
| *G06V 40/60* | (2022.01) |
| *G06V 10/28* | (2022.01) |

(52) U.S. Cl.
CPC ...... *G06V 40/1306* (2022.01); *G06V 40/1347* (2022.01); *G06V 10/26* (2022.01); *G06V 10/28* (2022.01); *G06V 40/1365* (2022.01); *G06V 40/67* (2022.01)

(58) Field of Classification Search
CPC ...... G06F 3/0488; G06F 3/016; G06F 3/0346; G06F 2203/04105; G06V 10/30; G06V 40/1306; G06V 40/1347; G06V 10/26; G06V 10/28; G06V 40/1365; G06V 40/67
See application file for complete search history.

(56) References Cited

U.S. PATENT DOCUMENTS

| | | | |
|---|---|---|---|
| 2018/0365470 A1* | 12/2018 | Li | .................. G06V 40/1347 |
| 2019/0087628 A1 | 3/2019 | Choe et al. | |
| 2020/0050828 A1* | 2/2020 | Li | ...................... G06T 5/002 |

FOREIGN PATENT DOCUMENTS

| | | | | |
|---|---|---|---|---|
| KR | 10-1291039 B1 | | 8/2013 | |
| KR | 10-2020-0010542 | * | 1/2020 | ............ G06F 21/32 |
| KR | 10-2020-0010542 A | | 1/2020 | |

* cited by examiner

ELECTRONIC DEVICE FOR RECOGNIZING FINGERPRINT OF USER AND METHOD THEREOF

CROSS-REFERENCE TO RELATED APPLICATION(S)

This application is based on and claims priority under 35 U.S.C. § 119(a) of a Korean patent application number 10-2020-0046895, filed on Apr. 17, 2020, in the Korean Intellectual Property Office, the disclosure of which is incorporated by reference herein in its entirety.

BACKGROUND

1. Field

The disclosure relates to an electronic device for acquiring fingerprint information of a user. More particularly, the disclosure relates to an electronic device which predicts a time to perform fingerprint recognition and acquires background information based on the predicted time.

2. Description of the Related Art

Biometric authentication technology refers to technology that identifies a user by using user's physical characteristics and allows access to a system, an electronic device, or data. More particularly, recent electronic devices, such as smartphones have fingerprint recognition sensors mounted therein and perform authentication through fingerprints. As user authentication for electronic devices is performed through fingerprints, convenience of screen unlocking and security for payment may be provided.

Fingerprint recognition sensors may be divided into capacitive sensors, optical sensors, and ultrasonic sensors. A capacitive fingerprint recognition sensor may recognize fingerprints by detecting a difference in capacitance between a ridge and a valley of the fingerprints. An optical fingerprint recognition sensor may acquire a fingerprint image reflected by light and may recognize fingerprints by comparing with previously registered fingerprint images. An ultrasonic fingerprint recognition sensor may acquire fingerprint data by measuring a difference in the amount of reflected ultrasonic signals and may recognize fingerprints by comparing with existing fingerprint data.

Meanwhile, there is a growing trend toward employing a bezel-less design to enhance an aesthetic aspect and a functional aspect of smartphones. Since a bezel area is omitted, a fingerprint recognition sensor positioned in the existing bezel area may be disposed under a display. Recently, a fingerprint on display (FOD) which recognizes fingerprints through a display screen is increasingly used.

The above information is presented as background information only to assist with an understanding of the disclosure. No determination has been made, and no assertion is made, as to whether any of the above might be applicable as prior art with regard to the disclosure.

SUMMARY

When fingerprint recognition is performed, a process of subtracting background information from fingerprint information acquired through a fingerprint recognition sensor may be required. The background information may be easily changed depending on a degree of wear-out of the fingerprint recognition sensor, an ambient temperature, and an electrical noise. As a difference between a time at which background information is acquired and a time at which fingerprint information is acquired increases, a fingerprint recognition rate may decrease.

However, since the time when the fingerprint information is acquired cannot be exactly predicted, it may not be easy to acquire background information right before the fingerprint information is acquired, and accordingly, a user may have an experience of failing fingerprint recognition when initially performing fingerprint recognition.

Aspects of the disclosure are to address at least the above-mentioned problems and/or disadvantages and to provide at least the advantages described below. Accordingly, an aspect of the disclosure is to provide an electronic device which predicts a time to perform fingerprint recognition and acquires background information based on the predicted time.

Additional aspects will be set forth in part in the description which follows and, in part, will be apparent from the description, or may be learned by practice of the presented embodiments.

In accordance with an aspect of the disclosure, an electronic device is provided. The electronic device includes a display, a fingerprint recognition sensor disposed under a first area of the display, at least one input detection sensor, and at least one processor electrically connected with the display, the fingerprint recognition sensor, and the at least one input detection sensor, and the at least one processor is configured to detect a designated event through the at least one input detection sensor, acquire background information through the fingerprint recognition sensor according to detection of the designated event, acquire fingerprint information of an object through the fingerprint recognition sensor in response to detecting the object on the first area of the display, and subtract the background information from the fingerprint information.

In accordance with another aspect of the disclosure, a method of operating an electronic device is provided. The method includes detecting a designated event through at least one input detection sensor, acquiring background information through a fingerprint recognition sensor according to detection of the designated event, acquiring fingerprint information of an object through the fingerprint recognition sensor in response to detecting the object on a first area of a display, and subtracting the background information from the fingerprint information.

In an embodiment of the disclosure, a computer-readable recording medium which stores instructions performs detecting a designated event through at least one input detection sensor, acquiring background information through a fingerprint recognition sensor according to detection of the designated event, acquiring fingerprint information of an object through the fingerprint recognition sensor in response to detecting the object on a first area of a display, and subtracting the background information from the fingerprint information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
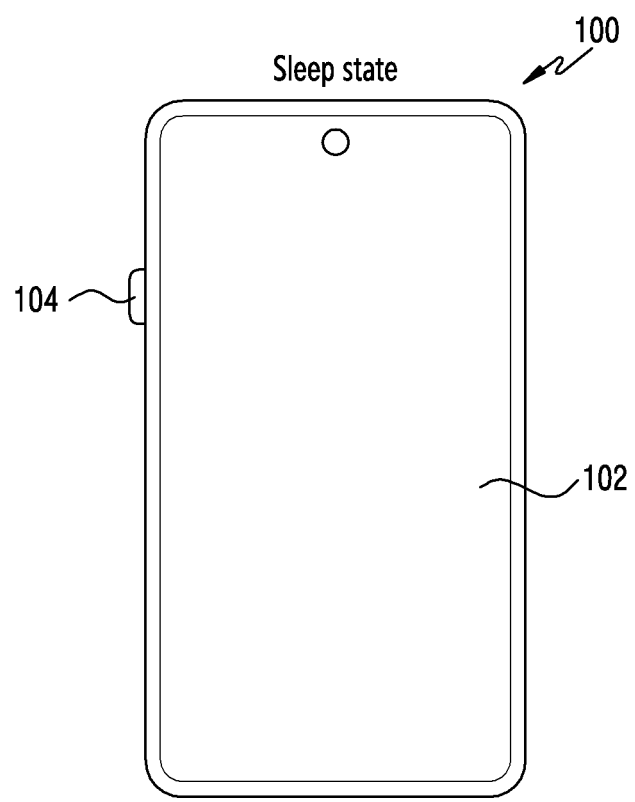
FIG. 1A is a view illustrating a sleep state of an electronic device before an input event is detected according to an embodiment of the disclosure.
Figure 1B:
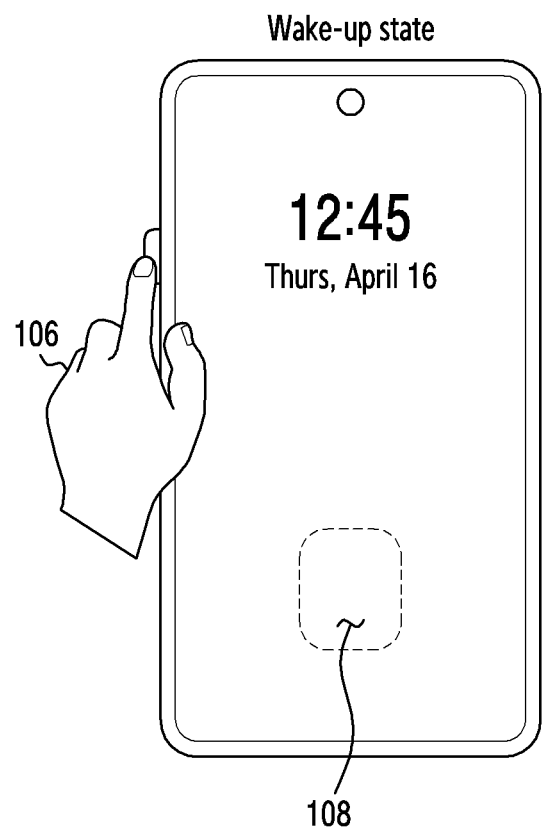
FIG. 1B is a view illustrating a wake-up state of an electronic device after an input event is detected according to an embodiment of the disclosure.
Figure 1C:
FIG. 1C is a view illustrating a state where an electronic device detecting an input event acquires fingerprint information according to an embodiment of the disclosure.

FIG. 1A illustrates a sleep state of an electronic device before an input event is detected according to an embodiment of the disclosure. FIG. 1B illustrates a wake-up state of an electronic device after an input event is detected according to an embodiment of the disclosure. FIG. 1C illustrates a state where an electronic device detecting an input event acquires fingerprint information according to an embodiment of the disclosure.

Referring to FIGS. 1A, 1B, and 1C, the electronic device 100 may include a display 102 and a physical key button 104. In an embodiment of the disclosure, the physical key button 104 may be disposed on a side surface of a housing of the electronic device 100. In another embodiment of the disclosure, the physical key button 104 may be disposed on a certain area of a front surface or a certain area of a rear surface of the electronic device 100. In an embodiment of the disclosure, the physical key button 104 may be connected with a pressure sensor disposed within the electronic device 100. The electronic device 100 may detect an input by detecting a pressure change on the physical key button 104.

Referring to FIG. 1A, when the electronic device 100 is in a sleep state, driving of a processor may be restricted. For example, when the electronic device 100 is in the sleep state, the display 102 may display a substantially black background screen. In another embodiment of the disclosure, when the electronic device 100 is in the sleep state, an always-on display (AOD) function may be enabled. For example, when the electronic device 100 is in the sleep state and the AOD function is enabled, the display 102 may display a background screen including at least one of time information, weather information, and state information (for example, battery remaining capacity information).

In an embodiment of the disclosure, the electronic device 100 may further include a processor configured to control a sensor module as a part of the processor or separately. For example, while the electronic device 100 is in the sleep state, the electronic device 100 may detect a user input through the sensor module.

Referring to FIG. 1B, the electronic device 100 may switch to a wake-up state according to a user input 106 on the physical key button 104. In an embodiment of the disclosure, the electronic device 100 may switch to the wake-up state when the user input 106 corresponding to a pre-set input is received. For example, the electronic device 100 may receive the user input 106 on the physical key button 104 disposed on the side surface of the housing.

In an embodiment of the disclosure, the electronic device 100 which switches to the wake-up state may display at least one graphic element. In another embodiment of the disclosure, when the electronic device 100 switches to the wake-up state with the AOD function being enabled, the electronic device 100 may display at least one graphic element which is distinct from the AOD function. For example, the electronic device 100 which has the AOD function enabled in the sleep state may display some pieces of information (for example, time information, weather information, state information) on the black background screen. When the electronic device 100 switches to the wake-up state, the electronic device 100 may display some pieces of information on the background screen (for example, a user setting background screen) according to enabling of the display 102.

In an embodiment of the disclosure, the electronic device 100 may include a first area 108 that overlaps an area in which a fingerprint recognition sensor (not shown) is disposed under the display 102. In an embodiment of the disclosure, the electronic device 100 may acquire background information on the first area 108 through the fingerprint recognition sensor. For example, when the fingerprint recognition sensor is a fingerprint recognition sensor of an ultrasonic method, the electronic device 100 may acquire background information by transmitting ultrasonic signals in the first area 108 and receiving reflected signals. The electronic device 100 may use the acquired background information to increase accuracy of fingerprint information acquired from the user. In an embodiment of the disclosure, when a plurality of fingerprint recognition sensors are disposed in a lower end area of the display 102, the electronic device 100 may include a plurality of areas overlapping the area where the plurality of fingerprint recognition sensors are disposed.

Referring to FIG. 1C, the electronic device 100 which switches to the wake-up state may provide guide information regarding fingerprint recognition. In an embodiment of the disclosure, the electronic device 100 may display guide information 110 on an area corresponding to the first area 108 in FIG. 1B. The guide information 110 may correspond to information for inducing the user to input fingerprint information. In an embodiment of the disclosure, the electronic device 100 may display the guide information 110 after acquiring the background information in FIG. 1B. In an embodiment of the disclosure, the electronic device 100 may acquire the background information even while displaying the guide information 110. For example, the electronic device 100 may acquire the background information according to a predetermined period (for example, 1 second) from a time when the guide information 110 is displayed.

FIGS. 1A, 1B, and 1C illustrate the embodiment where the user input 106 is received through the physical key button 104, but this is merely for convenience of explanation and this should not be considered as limiting. In another embodiment of the disclosure, the user input 106 may be an input that is detected through an input device connected with the sensor module (for example, a touch sensor, an acceleration sensor, a gyro sensor, a hall sensor, a proximity sensor, a distance sensor, or the like) disposed in the electronic device 100, and may refer to an input corresponding to a pre-set input. For example, when the electronic device 100 is an electronic device that has an accessory device (for example, a flip cover) mounted thereon, the electronic device 100 may detect an input (for example, a change in magnetism) through a hall sensor and may switch to the wake-up state, and may acquire background information. In another example, the electronic device 100 may refer to a foldable electronic device that can go into a folded state and a flat state. In this case, the electronic device 100 may detect an input (for example, a change from the folded state to the flat state) through a sensor and may switch to the wake-up state, and may acquire background information. In another example, the electronic device 100 may refer to a rollable electronic device that includes a first housing and a second housing, and can go into an open state and a closed state. In this case, the electronic device 100 may detect an input (for example, extension of a display as the second housing is spaced apart from the first housing) through a sensor and may switch to the wake-up state, and may acquire background information.

In addition, FIGS. 1A, 1B, and 1C illustrate the embodiment where the electronic device 100 acquires background information when the electronic device 100 switches from the sleep state to the wake-up state through the user input 106, but the electronic device 100 may acquire background information when a specific application is executed according to the user input 106. This will be described below.

Figure 2:
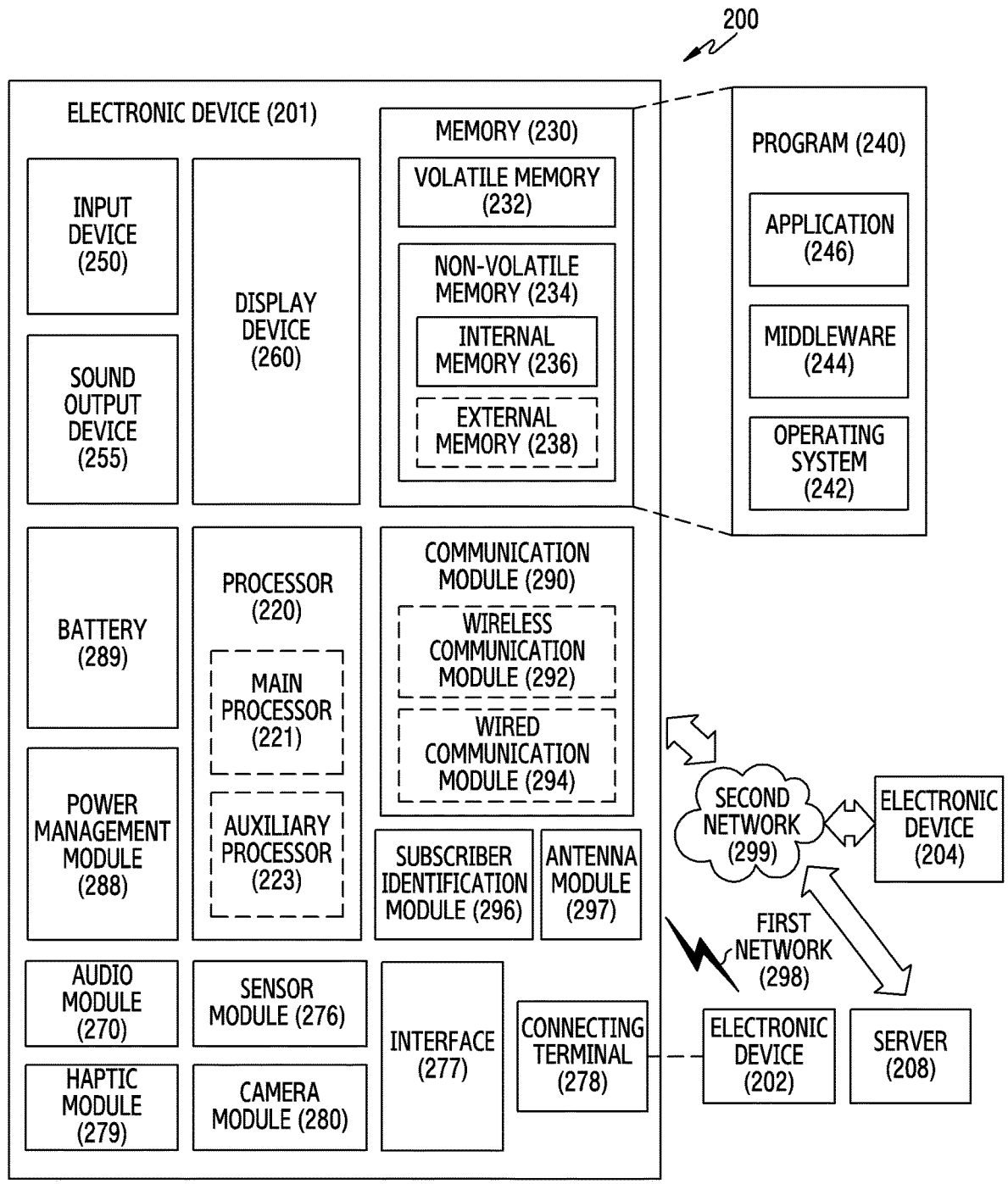
FIG. 2 is a block diagram of an electronic device in a network environment according to an embodiment of the disclosure.

FIG. 2 is a block diagram illustrating an electronic device in a network environment according to an embodiment of the disclosure.

Referring to FIG. 2, an electronic device 201 in a network environment 200 may communicate with an external electronic device 202 via a first network 298 (e.g., a short-range wireless communication network), or an external electronic device 204 or a server 208 via a second network 299 (e.g., a long-range wireless communication network). According to an embodiment of the disclosure, the electronic device 201 may communicate with the external electronic device 204 via the server 208. According to an embodiment of the disclosure, the electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module (SIM) 296, or an antenna module 297. In some embodiments of the disclosure, at least one (e.g., the display device 260 or the camera module 280) of the components may be omitted from the electronic device 201, or one or more other components may be added in the electronic device 201. In some embodiments of the disclosure, some of the components may be implemented as single integrated circuitry. For example, the sensor module 276 (e.g., a fingerprint sensor, an iris sensor, or an illuminance sensor) may be implemented as embedded in the display device 260 (e.g., a display).

The processor 220 may execute, for example, software (e.g., a program 240) to control at least one other component (e.g., a hardware or software component) of the electronic device 201 coupled with the processor 220, and may perform various data processing or computation. According to an embodiment of the disclosure, as at least part of the data processing or computation, the processor 220 may load a command or data received from another component (e.g., the sensor module 276 or the communication module 290) in a volatile memory 232, process the command or the data stored in the volatile memory 232, and store resulting data in a non-volatile memory 234. According to an embodiment of the disclosure, the processor 220 may include a main processor 221 (e.g., a central processing unit (CPU) or an application processor (AP)), and an auxiliary processor 223 (e.g., a graphics processing unit (GPU), an image signal processor (ISP), a sensor hub processor, or a communication processor (CP)) that is operable independently from, or in conjunction with, the main processor 221. Additionally or alternatively, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display device 260, the sensor module 276, or the communication module 290) among the components of the electronic device 201, instead of the main processor 221 while the main processor 221 is in an inactive (e.g., a sleep) state, or together with the main processor 221 while the main processor 221 is in an active state (e.g., executing an application). According to an embodiment of the disclosure, the auxiliary processor 223 (e.g., an image signal processor or a communication processor) may be implemented as part of another component (e.g., the camera module 280 or the communication module 290) functionally related to the auxiliary processor 223.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input device 250 may receive a command or data to be used by other component (e.g., the processor 220) of the electronic device 201, from the outside (e.g., a user) of the electronic device 201. The input device 250 may include, for example, a microphone, a mouse, a keyboard, or a digital pen (e.g., a stylus pen).

The sound output device 255 may output sound signals to the outside of the electronic device 201. The sound output device 255 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 260 may visually provide information to the outside (e.g., a user) of the electronic device 201. The display device 260 may include, for example, a display, a hologram device, or a projector and control circuitry to control a corresponding one of the display, hologram device, and projector. According to an embodiment of the disclosure, the display device 260 may include touch circuitry adapted to detect a touch, or sensor circuitry (e.g., a pressure sensor) adapted to measure the intensity of force incurred by the touch.

The audio module 270 may convert a sound into an electrical signal and vice versa. According to an embodiment of the disclosure, the audio module 270 may obtain the sound via the input device 250, or output the sound via the sound output device 255 or a headphone of an external electronic device (e.g., an external electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment of the disclosure, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the external electronic device 202) directly (e.g., wiredly) or wirelessly. According to an embodiment of the disclosure, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the external electronic device 202). According to an embodiment of the disclosure, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 279 may include, for example, a motor, a piezoelectric element, or an electric stimulator.

The camera module 280 may capture an image or moving images. According to an embodiment of the disclosure, the camera module 280 may include one or more lenses, image sensors, image signal processors, or flashes.

The power management module 288 may manage power supplied to the electronic device 201. According to one embodiment of the disclosure, the power management module 288 may be implemented as at least part of, for example, a power management integrated circuit (PMIC).

The battery 289 may supply power to at least one component of the electronic device 201. According to an embodiment of the disclosure, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the external electronic device 202, the external electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment of the disclosure, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The antenna module 297 may transmit or receive a signal or power to or from the outside (e.g., the external electronic device) of the electronic device 201. According to an embodiment of the disclosure, the antenna module 297 may include an antenna including a radiating element composed of a conductive material or a conductive pattern formed in or on a substrate (e.g., a PCB). According to an embodiment of the disclosure, the antenna module 297 may include a plurality of antennas. In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment of the disclosure, another component (e.g., a radio frequency integrated circuit (RFIC)) other than the radiating element may be additionally formed as part of the antenna module 297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 201 and the external electronic device 204 via the server 208 coupled with the second network 299. Each of the external electronic devices 202 and 204 may be a device of a same type as, or a different type, from the electronic device 201. According to an embodiment of the disclosure, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, or client-server computing technology may be used, for example.

Figure 3:
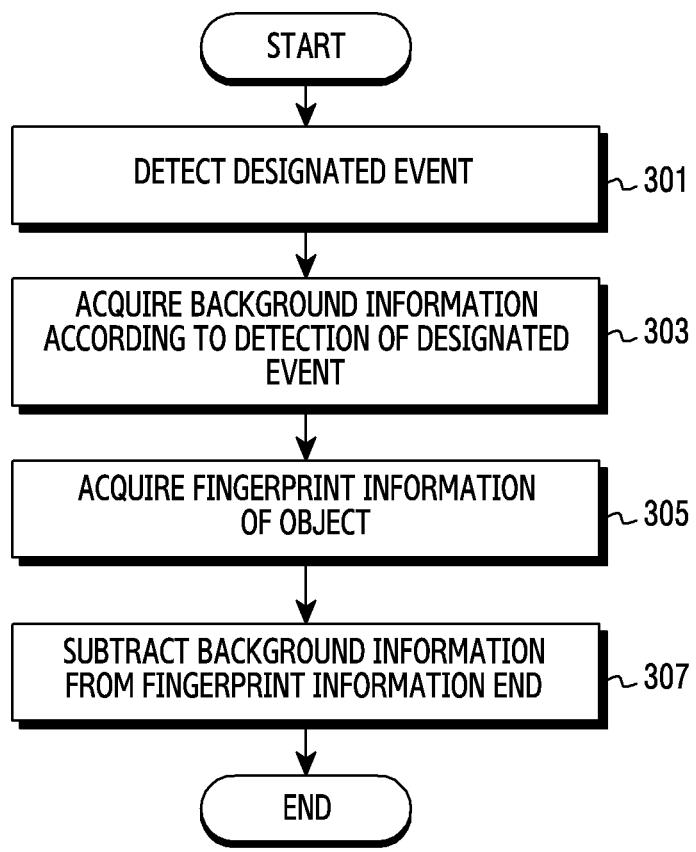
FIG. 3 is a flowchart of an electronic device which acquires fingerprint information according to a designated event according to an embodiment of the disclosure.

FIG. 3 is a flowchart of an electronic device which acquires fingerprint information according to a designated event according to an embodiment of the disclosure.

Referring to FIG. 3, a processor (for example, the processor 220 of FIG. 2) of an electronic device (for example, the electronic device 100 of FIG. 1A) may detect a designated event in operation 301. In an embodiment of the disclosure, the designated event may refer to a user input corresponding to a pre-set input. In an embodiment of the disclosure, the processor 220 may determine whether an input detected through a sensor module (for example, the sensor module 276 of FIG. 2) corresponds to the pre-set input. For example, the processor 220 may determine whether the input detected by the sensor module 276 is an input for switching the electronic device 100 in a sleep state to a wake-up state. In another example, the processor 220 may determine whether the input detected by the sensor module 276 is an input related to a specific application. In another embodiment of the disclosure, the designated event may refer to a state change of a display (for example, the display 102 of FIG. 1A). This will be described below with reference to FIGS. 8, 9A, and 9B.

According to an embodiment of the disclosure, the processor 220 may acquire background information according to the detection of the designated event in operation 303. In an embodiment of the disclosure, the processor 220 may acquire the background information through a fingerprint recognition sensor disposed under the display (for example, the display 102 of FIG. 1A). In an embodiment of the disclosure, the background information may refer to information that is detected when nothing is placed on an area (for example, the first area) on the display 102 that overlaps an area where the fingerprint recognition sensor is disposed. For example, when the fingerprint recognition sensor is a fingerprint recognition sensor of an ultrasonic method, the background information may correspond to ultrasonic signal information reflected and received from a plurality of layers included in the display 102.

In an embodiment of the disclosure, after the background information is acquired in operation 303, the processor 220 may display guide information (for example, the guide information 110 of FIG. 1C) regarding fingerprint recognition through the display 102. When fingerprint information of an object is inputted at the time when the background information is acquired, sufficient background information may not be acquired, and therefore, the processor 220 may display the guide information 110 regarding the fingerprint recognition after acquiring the background information.

According to an embodiment of the disclosure, the processor 220 may acquire fingerprint information of the object in operation 305. In an embodiment of the disclosure, the fingerprint information may include substantial fingerprint information of the object and background information.

According to an embodiment of the disclosure, the processor 220 may subtract the background information from the fingerprint information in operation 307. For example, the processor 220 may subtract the background information from the fingerprint information in order to acquire the substantial fingerprint information of the object. In an embodiment of the disclosure, the fingerprint information of the object that is acquired by subtracting the background information may refer to fingerprint information that clearly distinguishes between ridges and valleys. The fingerprint information may refer to two-dimensional (2D) fingerprint data and/or three-dimensional (3D) fingerprint information.

In an embodiment of the disclosure, a method of operating an electronic device may include detecting a designated event through at least one input detection sensor, acquiring background information through a fingerprint recognition sensor according to detection of the designated event, acquiring fingerprint information of an object through the fingerprint recognition sensor in response to detecting the object on a first area of a display, and subtracting the background information from the fingerprint information.

In an embodiment of the disclosure, the designated event may include a user input of switching the electronic device from a sleep state to a wake-up state.

In an embodiment of the disclosure, the method may include, when the at least one input detection sensor is a touch sensor, acquiring the background information according to detection of a touch input on the display.

In an embodiment of the disclosure, the designated event may include a state change of the display.

In an embodiment of the disclosure, the method may include when the at least one input detection sensor is at least one of an acceleration sensor or a gyro sensor, detecting occurrence of the designated event according to a motion input on the electronic device corresponding to a pre-defined motion and acquiring the background information according to detection of the occurrence of the designated event.

In an embodiment of the disclosure, the method may include acquiring the background information according to detection of a pressure change through a physical button in response to the at least one input detection sensor being a pressure sensor connected to the physical button.

In an embodiment of the disclosure, the designated input may include a user input related to an application.

In an embodiment of the disclosure, the method may include acquiring the background information in response to a user input of executing the application.

In an embodiment of the disclosure, the method may include acquiring the background information in response to a user input of executing a function requesting the fingerprint information after entering the application.

In an embodiment of the disclosure, in an at least one non-transitory computer-readable recording medium which stores instructions, when the instructions are executed by a processor of an electronic device, the instructions may cause the electronic device to detect a designated event through at least one input detection sensor, acquire background information through a fingerprint recognition sensor according to detection of the designated event, acquire fingerprint information of an object through the fingerprint recognition sensor in response to detecting the object on a first area of a display, and subtracting the background information from the fingerprint information.

Figure 4:
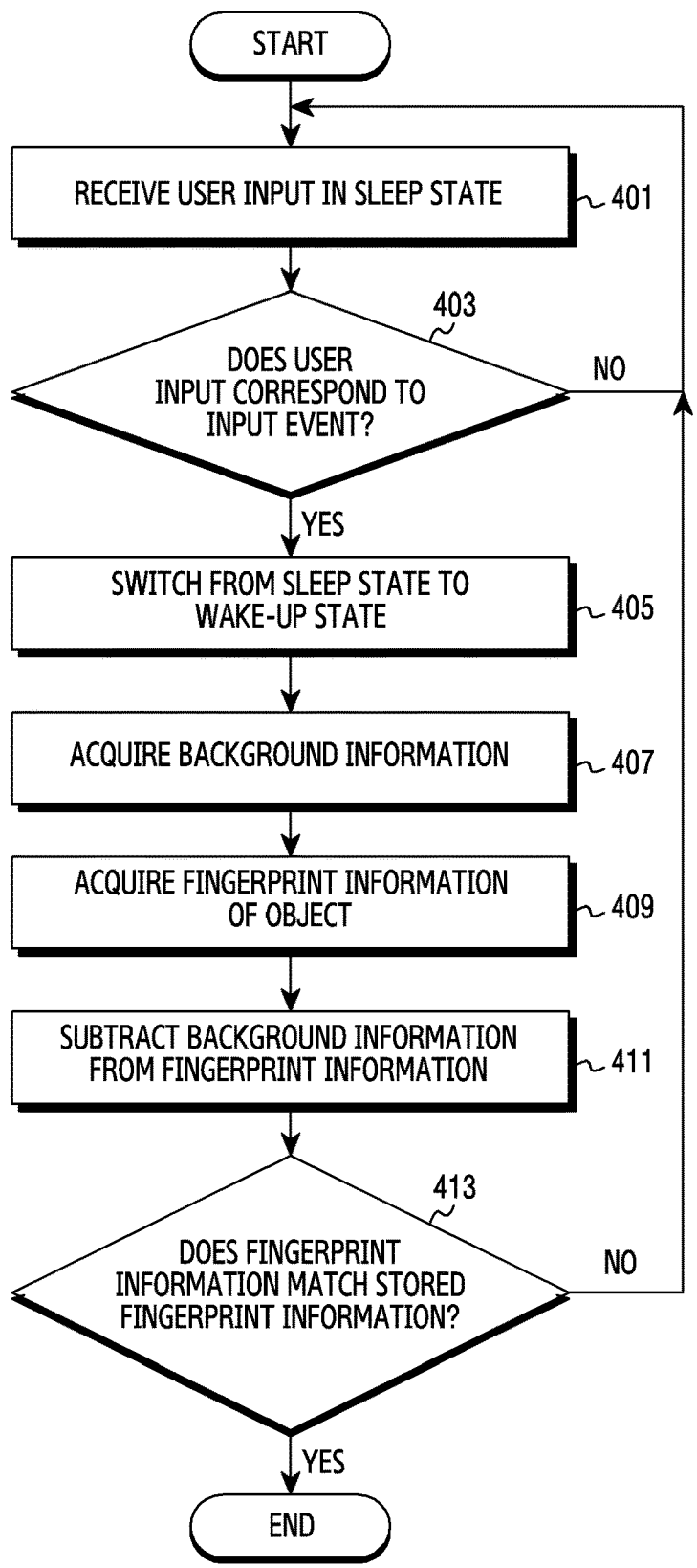
FIG. 4 is a flowchart of an electronic device which acquires fingerprint information according to a designated event of switching from a sleep state to a wake-up state according to an embodiment of the disclosure.

FIG. 4 is a flowchart of an electronic device which acquires fingerprint information according to a designated input event of switching from a sleep state to a wake-up state according to an embodiment of the disclosure. The features of FIG. 4 corresponding to those described above or the same or similar features may not be described.

Referring to FIG. 4, a processor (for example, the processor 220 of FIG. 2) of an electronic device (for example, the electronic device 100 of FIG. 1A) may receive a user input in a sleep state in operation 401. In an embodiment of the disclosure, the user input may correspond to at least one of a touch input, a hovering input, a physical button key input, or a motion input.

According to an embodiment of the disclosure, the processor 220 may determine whether the user input corresponds to an input event in operation 403. In an embodiment of the disclosure, the processor 220 may determine whether the user input is an input of switching the state of the electronic device 100 to the wake-up state. For example, when the user input is a touch input, the processor 220 may determine whether the touch input is a double tap input which is a pre-set input through a touch sensor. The pre-set input for the touch sensor may include at least one of a double tap input, a touch and drag input, a flick input, and a swipe input. In another example, when the user input is a physical button key input, the processor 220 may determine whether the physical button key input is a power key input which is a pre-set input through a pressure sensor. In another example, when the user input is a motion input, the processor 220 may determine whether the motion input is a motion input of lifting up the electronic device 100 through a motion sensor (for example, an acceleration sensor, a gyro sensor, or the like).

In an embodiment of the disclosure, the input of switching the state of the electronic device 100 to the wake-up state may be pre-set with respect to the touch sensor, the pressure sensor, or the motion sensor. The pre-set input may be changed according to certain setting in the electronic device 100, user setting, manufacturer setting, or the like.

According to an embodiment of the disclosure, when the user input corresponds to the input event, the processor 220 may switch the state of the electronic device 100 from the sleep state to the wake-up state in operation 405. For example, when the user input is a double tap input which is the pre-set input, the processor 220 may switch the state of the electronic device 100 to the wake-up state. The processor 220 may switch a state of a display (for example, the display 102 of FIG. 1A) from an off-state to an on-state.

According to an embodiment of the disclosure, the processor 220 may acquire background information in operation 407. In an embodiment of the disclosure, when the fingerprint recognition sensor is a fingerprint recognition sensor of an ultrasonic method, the electronic device 100 may include the display 102 that does not include an air layer. The processor 220 may transmit ultrasonic signals to the display 102 through the fingerprint recognition sensor of the ultrasonic method. The transmitted ultrasonic signals may be reflected on the plurality of layers of the display 102. By receiving the reflected ultrasonic signals, the processor 220 may detect a wave change in the ultrasonic signals. The processor 220 may acquire background information based on the detected wave change.

In an embodiment of the disclosure, operation 407 may be performed after operation 405 or may be performed in parallel with operation 405.

According to an embodiment of the disclosure, the processor 220 may acquire fingerprint information of an object in operation 409. The processor 220 may transmit ultrasonic signals to the display 102 and the object through the fingerprint recognition sensor. In an embodiment of the disclosure, the processor 220 may receive ultrasonic signals reflected on the plurality of layers of the display 102 and a fingerprint area of the object. Based on the received ultrasonic signals, the processor 220 may acquire fingerprint information including background information and substantial fingerprint information of the object.

According to an embodiment of the disclosure, the processor 220 may subtract the background information from the fingerprint information in operation 411. In an embodiment of the disclosure, the substantial fingerprint information of the object acquired by subtracting the background information may refer to fingerprint information that clearly distinguishes between ridges and valleys. The fingerprint information may refer to 2D fingerprint data and/or 3D fingerprint data.

According to an embodiment of the disclosure, the processor 220 may determine whether the substantial fingerprint information from which the background information is subtracted matches stored fingerprint information in operation 413. In an embodiment of the disclosure, the processor 220 may extract feature points from the substantial fingerprint information. In an embodiment of the disclosure, the processor 220 may compare a distribution of feature points of the fingerprint information stored in a memory (for example, the memory 230 of FIG. 2) and a distribution of the feature points of the substantial fingerprint information. In an embodiment of the disclosure, the processor 220 may determine that the fingerprint information matches when the distribution of the feature points of the fingerprint information stored in the memory and the distribution of the feature points of the fingerprint information are similar to each other by a threshold value (for example, 95%) or higher.

Although FIG. 4 illustrates the electronic device 100 acquiring the background information based on the user input, the electronic device 100 according to another embodiment may acquire background information based on an accessory device which is attachable to or detachable from the electronic device 100. For example, the accessory device may include a portion configured to cover to open or close at least a portion of the electronic device 100. A sensor module (for example, the sensor module 276 of FIG. 2) of the electronic device 100 may include a hall sensor (hall IC). As the accessory device including a magnetic substance is changed from a first state in which the accessory device covers at least a portion of the electronic device 100 to a second state in which the accessory device does not cover, the processor 220 may detect a change in magnetism through the hall sensor. The processor 220 may switch the state of the electronic device 100 from the sleep state to the wake-up state based on the detected change in the magnetism. The processor 220 may acquire background information through the fingerprint recognition sensor as the state of the electronic device 100 switches to the wake-up state. In addition, the electronic device 100 may be implemented by a foldable electronic device which acquires background information based on an input (for example, a state change from a folded state to a flat state) through a sensor, and a rollable electronic device which acquires background information based on an input (for example, extension of a display as a second housing is spaced apart from a first housing) through a sensor.

Figure 5:
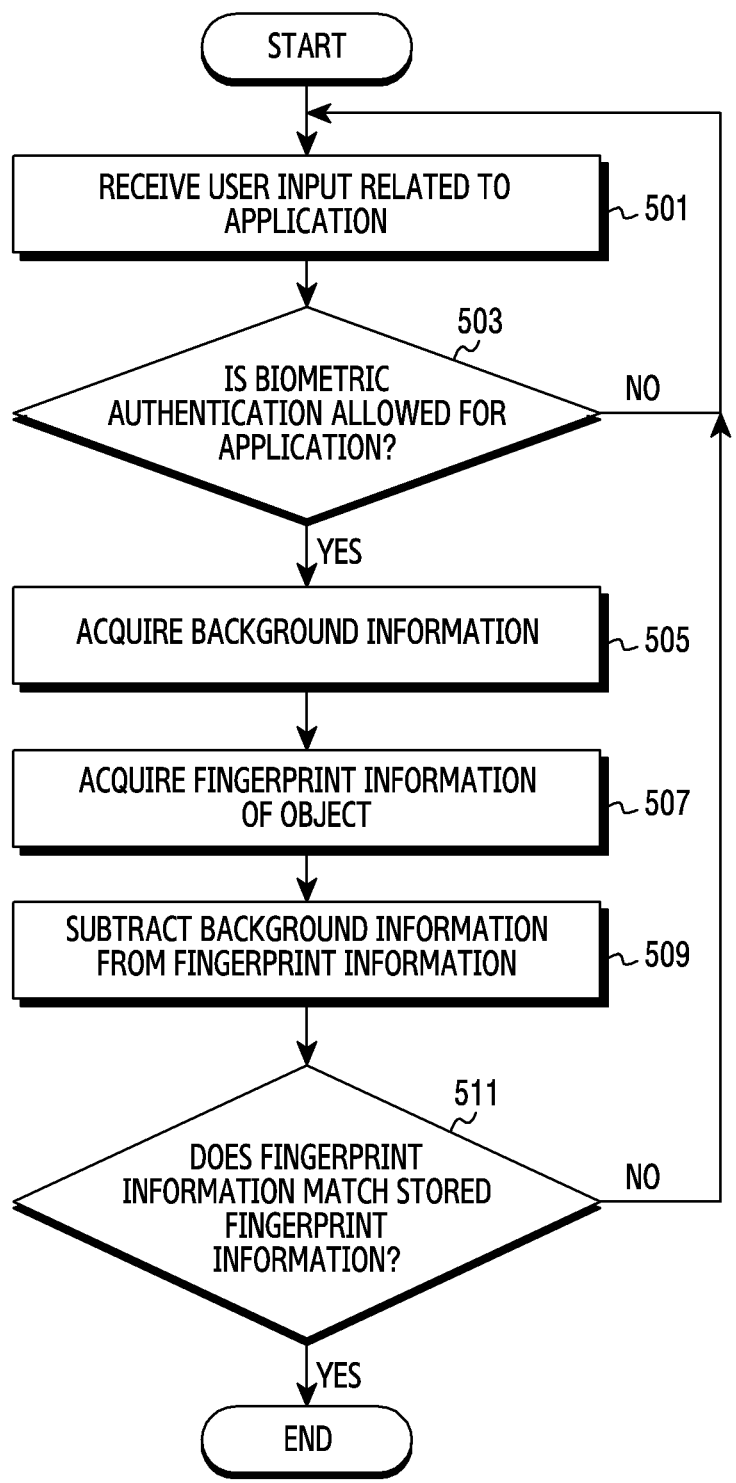
FIG. 5 is a flowchart of an electronic device which acquires fingerprint information based on execution of an application according to an embodiment of the disclosure.

FIG. 5 is a flowchart of an electronic device which acquires fingerprint information based on execution of an application according to an embodiment of the disclosure.

Referring to FIG. 5, a processor (for example, the processor 220 of FIG. 2) of an electronic device (for example, the electronic device 100 of FIG. 1A) may receive a user input related to an application in operation 501. In an embodiment of the disclosure, the user input may refer to a touch input of executing a specific application.

According to an embodiment of the disclosure, the processor 220 may determine whether biometric authentication is allowed with respect to the application in operation 503. In an embodiment of the disclosure, the processor 220 may determine whether a biometric authentication library is included in data related to the application. The application including the biometric recognition library may correspond to at least one of a payment application (for example, Samsung pay), a bank application, or an authentication application. In an embodiment of the disclosure, when the biometric recognition library is included, the processor 220 may determine whether biometric authentication regarding the application is allowed. It may be set whether the biometric authentication regarding the application is allowed by a user at the time when the application is initially executed, and the setting may be changed afterward.

According to an embodiment of the disclosure, when the biometric authentication for the application is allowed, the processor 220 may acquire background information in operation 505. In an embodiment of the disclosure, the processor 220 may transmit ultrasonic signals to a display (for example, the display 102 of FIG. 1A) through a fingerprint recognition sensor of an ultrasonic method. The transmitted ultrasonic signals may be reflected on the plurality of layers of the display 102. By receiving the reflected ultrasonic signals, the processor 220 may detect a wave change of the ultrasonic signals. The processor 220 may acquire the background information based on the detected wave change.

According to an embodiment of the disclosure, the processor 220 may acquire fingerprint information of an object in operation 507. The processor 220 may transmit ultrasonic signals to the display 120 and the object through the fingerprint recognition sensor. In an embodiment of the disclosure, the processor 220 may receive ultrasonic signals reflected from the plurality of layers of the display 120 and a fingerprint area of the object. Based on the received ultrasonic signals, the processor 220 may acquire the fingerprint information which includes background information and substantial fingerprint information of the object.

According to an embodiment of the disclosure, the processor 220 may subtract the background information from the fingerprint information in operation 509. In an embodiment of the disclosure, the substantial fingerprint information of the object that is acquired by subtracting the background information may refer to fingerprint information that clearly distinguishes between ridges and valleys.

According to an embodiment of the disclosure, the processor 220 may determine whether the substantial fingerprint information from which the background information is subtracted matches stored fingerprint information in operation 511. In an embodiment of the disclosure, the processor 220 may extract feature points from the substantial fingerprint information. In an embodiment of the disclosure, the processor 220 may compare a distribution of feature points of the fingerprint information stored in a memory (for example, the memory 230 of FIG. 2) and a distribution of feature points of the substantial fingerprint information. In an embodiment of the disclosure, the processor 220 may determine that the fingerprint information matches when the distribution of the feature points of the fingerprint information stored in the memory and the distribution of the feature points of the fingerprint information are similar to each other by a threshold value (for example, 95%) or higher.

Figure 6:
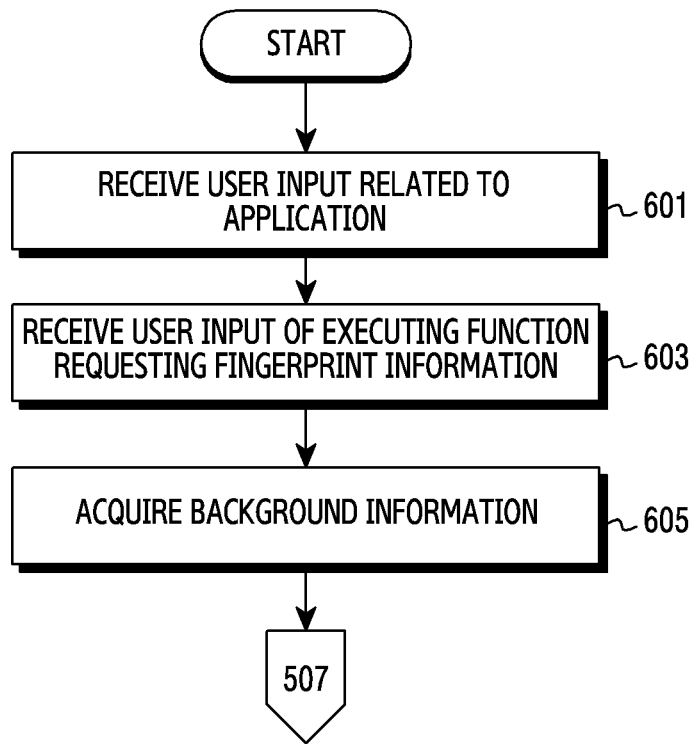
FIG. 6 is a flowchart of an electronic device which acquires fingerprint information based on execution of a specific function of an application according to an embodiment of the disclosure.

FIG. 6 is a flowchart of an electronic device which acquires fingerprint information based on execution of a specific function of an application according to an embodiment of the disclosure. The features of FIG. 6 corresponding to those described above or the same or similar features may not be described.

Referring to FIG. 6, a processor (for example, the processor 220 of FIG. 2) of an electronic device (for example, the electronic device 100 of FIG. 1A) may receive a user input related to an application in operation 601. In an embodiment of the disclosure, the user input may refer to a touch input of executing a specific application.

According to an embodiment of the disclosure, the processor 220 may receive a user input of executing a function requesting fingerprint information in operation 603. For example, the user input in a payment application (for example, Samsung pay) may correspond to a user input of executing a payment function. In another example, the user input in a bank application may correspond to a user input of executing log-in or an account transfer function. In another example, the user input in an authentication application (for example, Samsung pass) may correspond to a user input of executing an identification function. In addition, the user input may correspond to a user input of executing a function of unlocking a locking file in a storage application.

According to an embodiment of the disclosure, the processor 220 may acquire background information in operation 605. In an embodiment of the disclosure, the processor 220 may transmit ultrasonic signals to a display (for example, the display 102 of FIG. 1A) through a fingerprint recognition sensor of an ultrasonic method, and may receive reflected signals. The processor 220 may acquire background information by detecting a wave change of the ultrasonic signals. In an embodiment of the disclosure, the processor 220 may perform operation 507 after acquiring the background information.

Figure 7A:
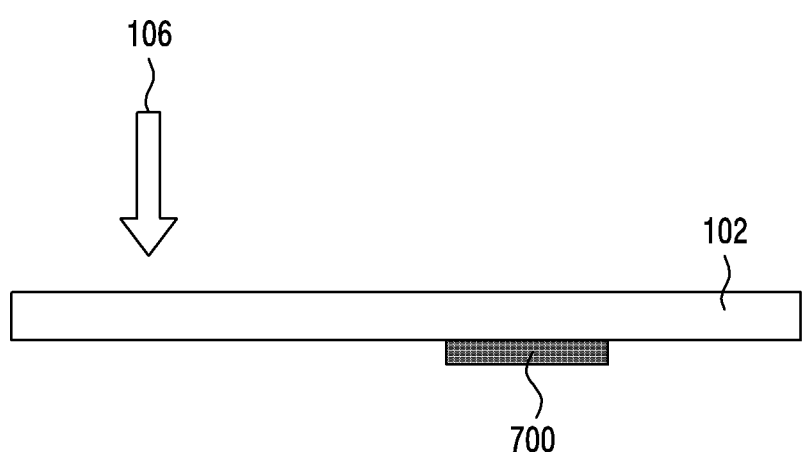
FIG. 7A is a cross-sectional view of an electronic device according to a first operation in a process of acquiring background information and fingerprint information according to an embodiment of the disclosure.
Figure 7B:
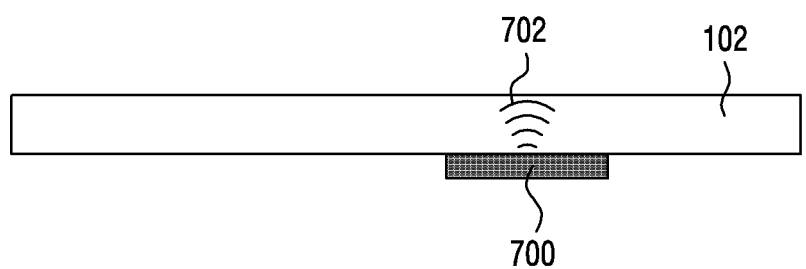
FIG. 7B is a cross-sectional view of an electronic device according to a second operation in a process of acquiring background information and fingerprint information according to an embodiment of the disclosure.
Figure 7C:
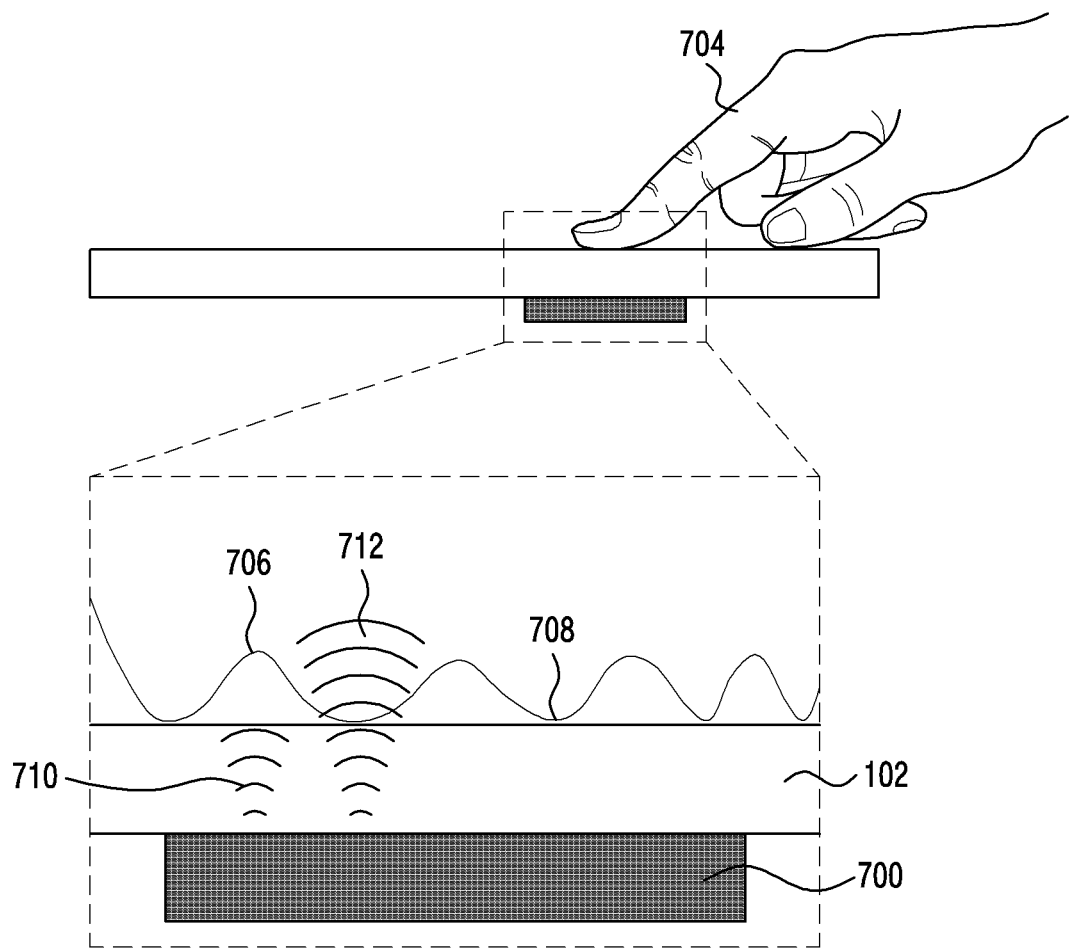
FIG. 7C is a cross-sectional view of an electronic device according to a third operation in a process of acquiring background information and fingerprint information according to an embodiment of the disclosure.

FIG. 7A is a cross-sectional view of an electronic device according to a first operation in a process of acquiring background information and fingerprint information according to an embodiment of the disclosure. FIG. 7B is a cross-sectional view of an electronic device according to a second operation in a process of acquiring background information and fingerprint information according to an embodiment of the disclosure. FIG. 7C is a cross-sectional view of an electronic device according to a third operation in a process of acquiring background information and fingerprint information according to an embodiment of the disclosure. The features of FIGS. 7A, 7B, and 7C corresponding to those described above, or the same or similar features may not be described.

Referring to FIG. 7A, the electronic device (for example, the electronic device 100 of FIG. 1A) may include a display 102 and a fingerprint recognition sensor 700. In an embodiment of the disclosure, the display 102 may include a display panel which is formed of a cover window and a plurality of layers. In an embodiment of the disclosure, the fingerprint recognition sensor 700 may correspond to a fingerprint recognition sensor for transmitting and receiving ultrasonic signals. In an embodiment of the disclosure, the fingerprint recognition sensor 700 may be disposed on at least a portion of one surface of the display 102. The size of the fingerprint recognition sensor, the number of fingerprint recognition sensors, and a position where the fingerprint recognition sensor is disposed may be variously changed according to a design of a manufacturer.

In an embodiment of the disclosure, the electronic device 100 may receive the user input 106. In an embodiment of the disclosure, the user input 106 may refer to an input of switching a state of the electronic device 100 from a sleep state to a wake-up state. For example, the user input 106 may include a double tap input on a touch screen, a power key input, a motion input of lifting up the electronic device 100. In another embodiment of the disclosure, the user input 106 may refer to an input of executing a specific application.

Referring to FIG. 7B, when the user input 106 on the electronic device 100 corresponds to a pre-set input, the fingerprint recognition sensor 700 may transmit ultrasonic signals 702 to the display 102. The electronic device 100 may acquire background information by receiving ultrasonic signals reflected from the display 102 to which the ultrasonic signals 702 are transmitted. For example, the electronic device 100 may receive ultrasonic signals reflected from interfaces between the plurality of layers included in the display 102, respectively, and may detect a wave change. The electronic device 100 may acquire background information based on the detected wave change.

Referring to FIG. 7C, the electronic device 100 may acquire fingerprint information of a user 704 on an area on the display 102 that overlaps an area where the fingerprint recognition sensor 700 is disposed. In an embodiment of the disclosure, fingerprints of the user 704 may include a valley 706 and a ridge 708. In an embodiment of the disclosure, the fingerprint recognition sensor 700 of the ultrasonic method may transmit ultrasonic signals to the display 102 and the fingerprints of the user 704 contacting the display 102. The ultrasonic signals may be transmitted through a solid medium (for example, skin). In an embodiment of the disclosure, ultrasonic signals 712 transmitted to an area of the ridge 708 of the fingerprints of the user 704 may be transmitted to the skin, and most of the signals may not be reflected. In an embodiment of the disclosure, ultrasonic signals 710 transmitted to an area of the valley 706 of the fingerprints of the user 704 may be reflected from an interface between an air layer and the display 102.

In an embodiment of the disclosure, an electronic device (for example, the electronic device 100 of FIG. 1A) may include a display (for example, the display 102 of FIG. 1A), a fingerprint recognition sensor (for example, the fingerprint recognition sensor 700 of FIG. 7A) disposed under a first area of the display, at least one input detection sensor (for example, the sensor module 276 of FIG. 2), and at least one processor electrically connected with the display, the fingerprint recognition sensor, and the at least one input detection sensor, and the at least one processor may be configured to detect a designated event through the at least one input detection sensor, acquire background information through the fingerprint recognition sensor according to detection of the designated event, acquire fingerprint information of an object through the fingerprint recognition sensor in response to detecting the object on the first area of the display, and subtract the background information from the fingerprint information.

In an embodiment of the disclosure, the designated event may include a user input of switching the electronic device from a sleep state to a wake-up state.

In an embodiment of the disclosure, the at least one processor may be configured to acquire the background information according to detection of a touch input on the display when the at least one input detection sensor is a touch sensor.

In an embodiment of the disclosure, the designated event may include a state change of the display.

In an embodiment of the disclosure, the at least one processor may be configured to when the at least one input detection sensor is at least one of an acceleration sensor or a gyro sensor, detect occurrence of the designated event in response to a motion input on the electronic device being a pre-defined motion, and acquire the background information according to detection of the occurrence of the designated event.

In an embodiment of the disclosure, when the at least one input detection sensor is a pressure sensor connected to a physical button, the at least one processor may be configured to acquire the background information according to detection of a pressure change through the physical button.

In an embodiment of the disclosure, the designated event may include a user input related to an application.

In an embodiment of the disclosure, the at least one processor may be configured to acquire the background information in response to a user input of executing the application.

In an embodiment of the disclosure, wherein the at least one processor may be configured to acquire the background information in response to a user input of executing a function requesting the fingerprint information according to execution of the application.

In an embodiment of the disclosure, the at least one processor may be configured to acquire the fingerprint information of the object in response to detecting the object on the first area of the display, after acquiring the background information through the fingerprint recognition sensor.

Figure 8:
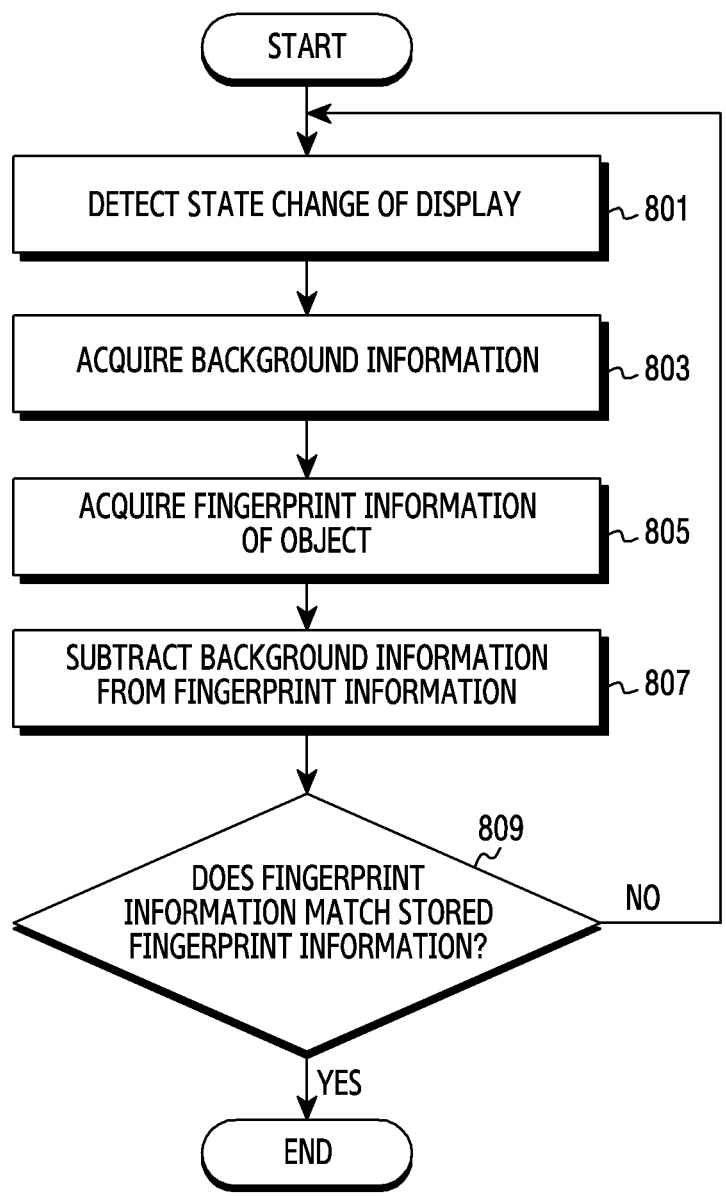
FIG. 8 is a flowchart of an electronic device which acquires fingerprint information according to detection of a state change of a display according to an embodiment of the disclosure.

FIG. 8 is a flowchart of an electronic device which acquires fingerprint information according to detection of a state change of a display according to an embodiment of the disclosure.

Referring to FIG. 8, a processor (for example, the processor 220 of FIG. 2) of an electronic device (for example, the electronic device 100 of FIG. 1A) may detect a state change of a display in operation 801. In an embodiment of the disclosure, the state change of the display may refer to switching the display from an on state to an off state or switching from an off state to an on state.

According to an embodiment of the disclosure, the processor 220 may acquire background information in operation 803. In an embodiment of the disclosure, the processor 220 may transmit ultrasonic signals to the display (for example, the display 102 of FIG. 1A) through a fingerprint recognition sensor of an ultrasonic method, and may receive reflected signals. By receiving the reflected signals, the processor 220 may detect a wave change of the signals. The processor 220 may acquire background information based on the detected wave change.

According to an embodiment of the disclosure, the processor 220 may acquire fingerprint information of an object in operation 805. The processor 220 may transmit ultrasonic signals to the display 102 and the object through the fingerprint recognition sensor. In an embodiment of the disclosure, the processor 220 may receive ultrasonic signals reflected from the plurality of layers of the display 120 and a fingerprint area of the object. Based on the received ultrasonic signals, the processor 220 may acquire fingerprint information which includes background information and substantial fingerprint information of the object.

According to an embodiment of the disclosure, the processor 220 may subtract the background information from the fingerprint information in operation 807. In an embodiment of the disclosure, the substantial fingerprint information of the object that is acquired by subtracting the background information may refer to fingerprint information that clearly distinguishes between ridges and valleys.

According to an embodiment of the disclosure, the processor 220 may determine whether the substantial fingerprint information from which the background information is subtracted matches stored fingerprint information in operation 809. In an embodiment of the disclosure, the processor 220 may extract feature points from the substantial fingerprint information. In an embodiment of the disclosure, the processor 220 may compare a distribution of feature points of the fingerprint information stored in a memory (for example, the memory 230 of FIG. 2) and a distribution of feature points of the substantial fingerprint information. In an embodiment of the disclosure, the processor 220 may determine that fingerprint information matches when the distribution of the feature points of the fingerprint information stored in the memory and the distribution of the feature points of the substantial fingerprint information are similar to each other by a threshold value (for example, 95%) or higher.

Figure 9A:
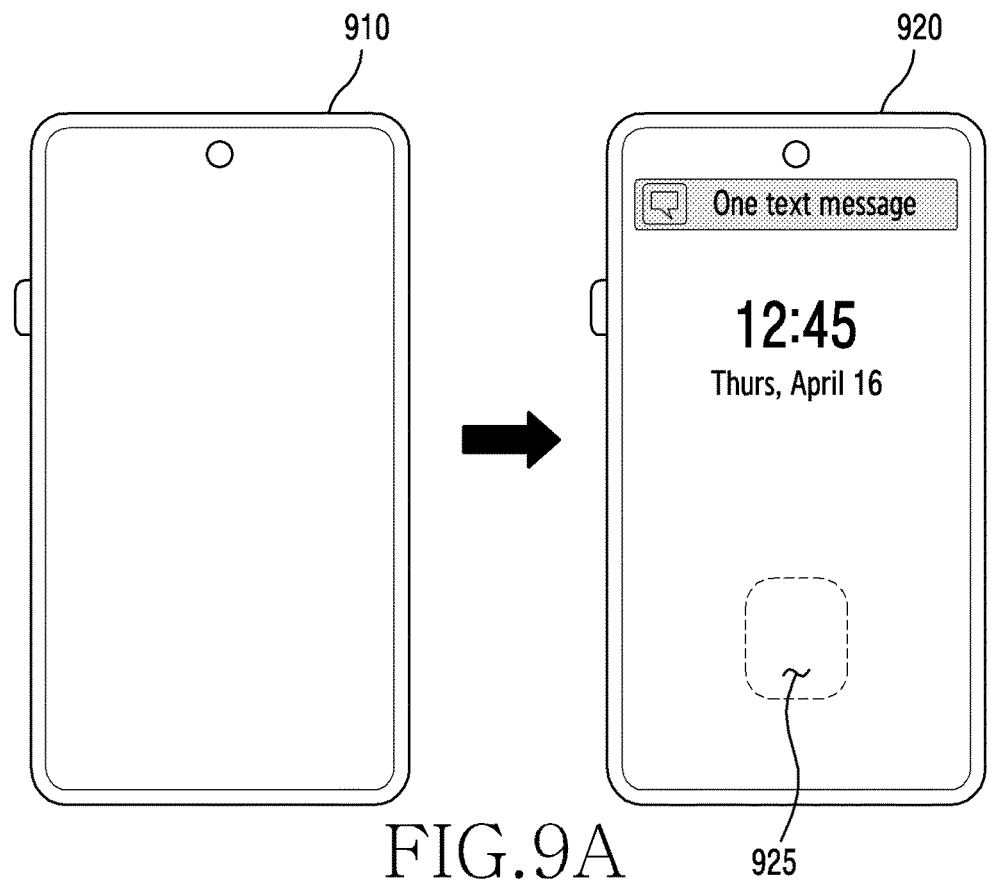
FIGS. 9A and 9B are views illustrating a state where an electronic device acquires background information according to detection of a state change of a display according to various embodiments of the disclosure.
Figure 9B:
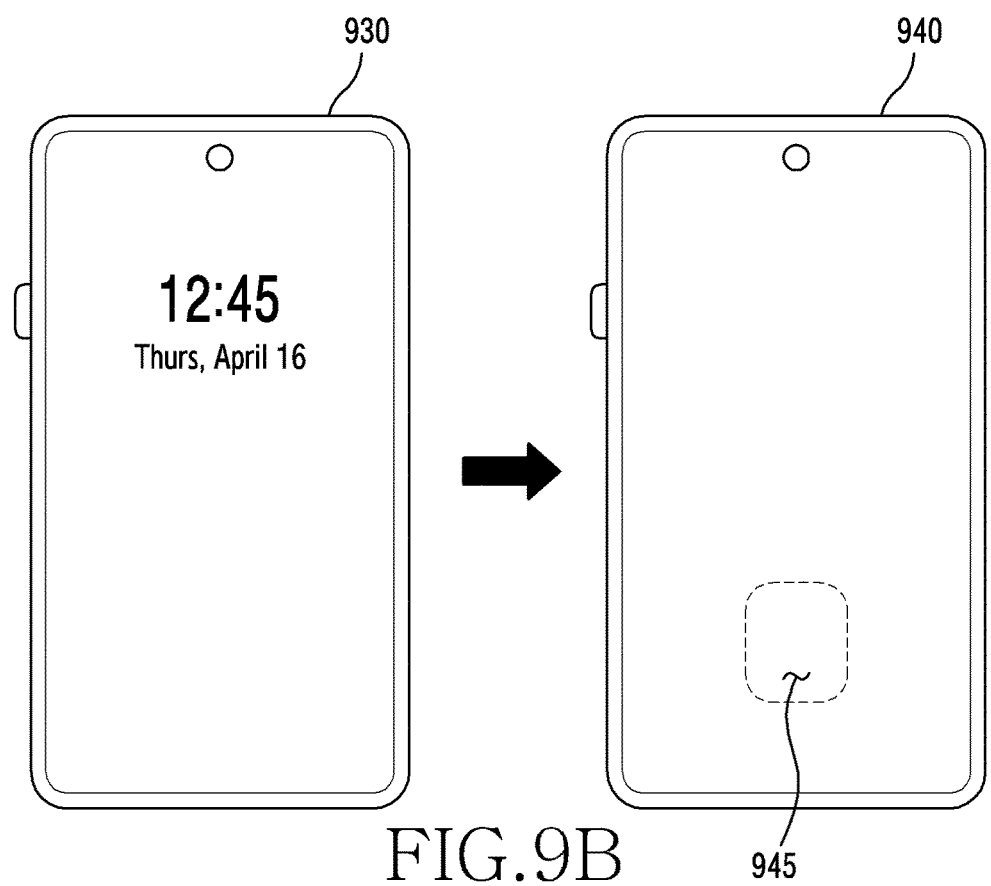

FIGS. 9A and 9B illustrate a state in which an electronic device acquires background information according to detection of a state change of a display according to various embodiments of the disclosure.

Referring to FIG. 9A, a processor (for example, the processor 220 of FIG. 2) may detect that a state of a display (for example, the display 102 of FIG. 1A) switches from an off state 910 (for example, a sleep state) to an on state 920 (for example, a wake-up state). For example, when a notification, such as a message reception notification, a notification in an installed application, a battery power-related notification (for example, an alarming notification on remaining battery capacity) is received, the processor 220 may detect that the state of the display 120 switches from the off state 910 to the on state 920. In an embodiment of the disclosure, when it is detected that the state of the display 102 switches to the on state 920, the processor 220 may acquire background information on a first area 925 (for example, the first area 108 of FIG. 1B) through a fingerprint recognition sensor. In another embodiment of the disclosure, after the state of the display 102 switches to the on state 920, the processor 220 may display guide information (for example, the guide information 110 of FIG. 1C) on an area corresponding to the first area 925. The processor 220 may acquire background information through the fingerprint recognition sensor while displaying the guide information 110.

Referring to FIG. 9B, the processor 220 may detect that the state of the display 102 switches from the on state 930 to the off state 940. For example, when a time according to certain setting in the application or user setting (for example, a screen auto-off time is set to 1 minute) is elapsed, the processor 220 may detect that the state of the display 120 switches from the on state 930 to the off state 940. In an embodiment of the disclosure, when it is detected that the state of the display 102 switches to the off state 940, the processor 220 may acquire background information on a first area 945 (for example, the first area 108 of FIG. 1B) through the fingerprint recognition sensor.

The electronic device according to various embodiments of the disclosure guarantees background information right before performing fingerprint recognition, so that a fingerprint recognition rate can be enhanced.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 240) including one or more instructions that are stored in a storage medium (e.g., an internal memory 236 or an external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a fingerprint recognition sensor disposed under a first area of the display;
   at least one input detection sensor; and
   at least one processor electrically connected with the display, the fingerprint recognition sensor, and the at least one input detection sensor,
   wherein the at least one processor is configured to:
      before an object is detected as the object is disposed on the first area of the display:
         detect a designated event through the at least one input detection sensor, wherein the designated event is related to predicting performing fingerprint recognition, and
         acquire background information through the fingerprint recognition sensor according to detection of the designated event, and
      in response to detecting the object as the object is disposed on the first area of the display:
         acquire fingerprint information of the object through the fingerprint recognition sensor, and
         subtract the background information from the fingerprint information.

2. The electronic device of claim 1, wherein the designated event comprises a user input of switching the electronic device from a sleep state to a wake-up state.

3. The electronic device of claim 2, wherein the at least one processor is further configured to acquire the background information according to detection of a touch input on the display when the at least one input detection sensor includes a touch sensor.

4. The electronic device of claim 1, wherein the designated event comprises a state change of the display.

5. The electronic device of claim 2, wherein the at least one processor is further configured to:
   when the at least one input detection sensor includes at least one of an acceleration sensor or a gyro sensor, detect occurrence of the designated event in response to a motion input on the electronic device being a predefined motion, and
   acquire the background information according to detection of the occurrence of the designated event.

6. The electronic device of claim 2, wherein, when the at least one input detection sensor is a pressure sensor connected to a physical button, the at least one processor is further configured to acquire the background information according to detection of a pressure change through the physical button.

7. The electronic device of claim 1, wherein the designated event comprises a user input related to an application.

8. The electronic device of claim 7, wherein the at least one processor is further configured to acquire the background information in response to a user input of executing the application.

9. The electronic device of claim 7, wherein the at least one processor is further configured to acquire the background information in response to a user input of executing a function requesting the fingerprint information according to execution of the application.

10. The electronic device of claim 1, wherein the at least one processor is further configured to acquire the fingerprint information of the object in response to detecting the object on the first area of the display, based on acquisition of the background information through the fingerprint recognition sensor.

11. A method of operating an electronic device, the method comprising:
  before an object is detected as the object is disposed on a first area of a display:
    detecting a designated event through at least one input detection sensor, and
    acquiring background information through a fingerprint recognition sensor according to detection of the designated event; and
  in response to detecting the object as the object is disposed on the first area of the display:
    acquiring fingerprint information of the object through the fingerprint recognition sensor, and
    subtracting the background information from the fingerprint information,
  wherein the designated event is related to predicting performing fingerprint recognition.

12. The method of claim 11, wherein the designated event comprises a user input of switching the electronic device from a sleep state to a wake-up state.

13. The method of claim 12, further comprising, when the at least one input detection sensor is a touch sensor, acquiring the background information according to detection of a touch input on the display.

14. The method of claim 11, wherein the designated event comprises a state change of the display.

15. The method of claim 12, further comprising:
  when the at least one input detection sensor is at least one of an acceleration sensor or a gyro sensor, detecting occurrence of the designated event according to a motion input on the electronic device corresponding to a pre-defined motion; and
  acquiring the background information according to detection of the occurrence of the designated event.

16. The method of claim 12, further comprising acquiring the background information according to detection of a pressure change through a physical button in response to the at least one input detection sensor being a pressure sensor connected to the physical button.

17. The method of claim 11,
  further comprising acquiring the background information in response to a user input of executing an application,
  wherein the designated event comprises a user input related to the application.

18. The method of claim 17, further comprising acquiring the background information in response to a user input of executing a function requesting the fingerprint information according to execution of the application.

19. The method of claim 11, further comprising:
  displaying guide information on an area corresponding to the first area, after acquiring the background information.

20. The method of claim 11, further comprising:
  predicting a time to perform the fingerprint recognition according to the detection of the designated event.

21. The method of claim 20, further comprising:
  acquiring the background information through the fingerprint recognition sensor based on the predicted time.

22. At least one non-transitory computer-readable recording medium which stores instructions, wherein, when the instructions are executed by a processor of an electronic device, the instructions cause the electronic device to:
  before an object is detected as the object is disposed on a first area of a display:
    detect a designated event through at least one input detection sensor, wherein the designated event is related to predicting performing fingerprint recognition, and
    acquire background information through a fingerprint recognition sensor according to detection of the designated event; and
  in response to detecting the object as the object is disposed on the first area of the display:
    acquire fingerprint information of an object through the fingerprint recognition sensor, and
    subtract the background information from the fingerprint information.

* * * * *